Dec. 27, 1960     H. M. OLSON     2,965,978
JOB PERFORMANCE BOARD
Filed March 16, 1959
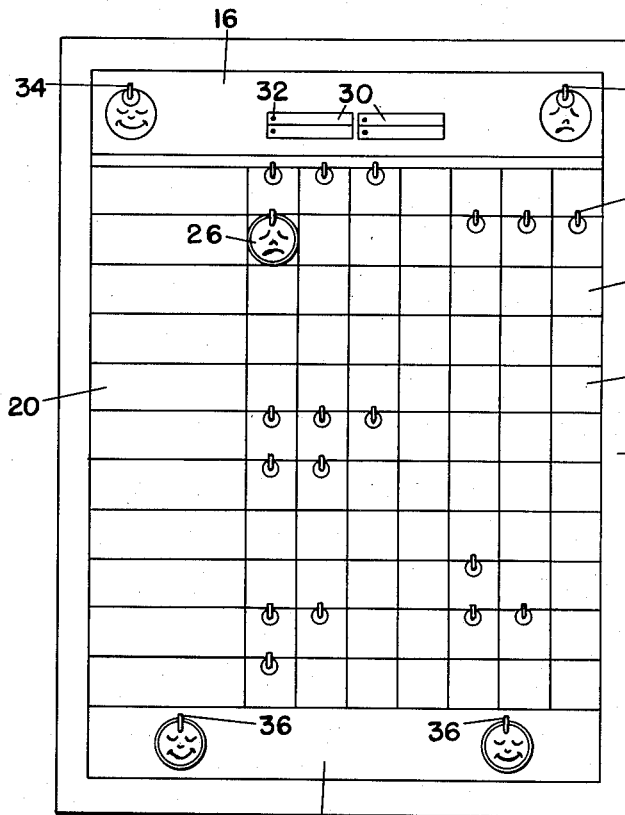
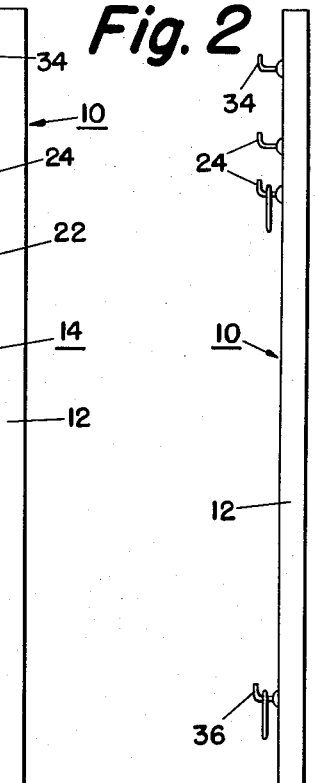
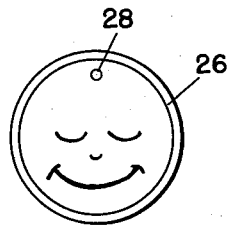
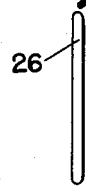
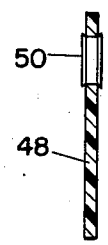
INVENTOR.
HARRIETTE M. OLSON
BY Arthur H. Seidel
ATTORNEY

United States Patent Office 2,965,978
Patented Dec. 27, 1960

2,965,978

JOB PERFORMANCE BOARD

Harriette M. Olson, Army War College, Carlisle Barracks, Carlisle, Pa.

Filed Mar. 16, 1959, Ser. No. 799,707

4 Claims. (Cl. 35—23)

This invention relates to a job performance board, and more particularly to a job performance board which is particularly useful in teaching children to carry out daily routine tasks.

In the raising of children, a problem is in teaching a child to regularly and promptly carry out such daily tasks as washings, brushing his teeth, dressing, properly eating his meals, going to bed on time, etc. As an incentive for the child to carry out such tasks, it is desirable to have a job performance board which would remind the child of the tasks, and would show whether the tasks were properly carried out or not on a routine basis. Also, for use in the classroom or in a home having more than one child, it would be desirable that such a job performance board could be used for a number of children in a manner that the children would be competing with each other to see which child properly carried out the most tasks over a given period.

In addition for use with children, such a job performance board would be useful in industrial plants, sales offices, and other commercial establishments. The job performance board could be used for showing various long-range operations, and the progress of such operations. In addition to many other uses, the job performance board could also be used to show the output of various operators or the amount of sales brought in by various salesmen as a part of an incentive program.

It is an object of the present invention to provide a novel job performance board.

It is another object of the present invention to provide a job performance board which indicates various tasks or operations, and the performance of such tasks or operations over a period of time.

It is a further object of the present invention to provide a job performance board for use in teaching children to carry out routine daily tasks.

Other objects will appear hereinafter.

For the purpose of illustrating the invention there is shown in the drawings forms which are presently preferred; it being understood, however, that this invention is not limited to the precise arrangements and instrumentalities shown.

Figure 1 is a front elevational view of the job performance board of the present invention.

Figure 2 is a side elevational view of the job performance board of the present invention.

Figure 3 is a front elevational view of the indicator disc used with the job performance board of the present invention.

Figure 4 is a side elevational view of the indicator disc.

Figure 5 is a front elevational view, partly broken away, of a portion of a modification of the job performance board of the present invention.

Figure 6 is a cross-sectional view of the indicator disc used with the modification of the job performance board of the present invention shown in Figure 5.

Referring initially to Figures 1 and 2, the job performance board of the present invention is generally designated as 10.

The job performance board 10 comprises a sheet 12 of a rigid material, such as wood, fiberboard, heavy cardboard, or plastic. Although the sheet 12 is shown to be rectangular, the sheet 12 can be square, circular, or any other desired shape. On the front surface of the sheet 12 there is provided a chart 14 having a plurality of blocks arranged in aligned columns and rows. The uppermost row of the blocks is spaced from the top of the chart 14 to provide a margin 16. The bottommost row of the blocks is spaced from the bottom of the chart 14 to provide a margin 18. The blocks 20 in the first column, the column at the left hand side of the chart 14 as viewed in Figure 1, are wider than the blocks 22 in the remaining columns. The smaller blocks 22 are all of the same width. Each of the blocks 20 in the first column is provided with indicia to indicate a task to be carried out. Such indicia may be in the form of writing and/or pictures illustrating the task. Thus, for teaching children, the various routine tasks to be carried out during a day are individually indicated in the blocks 20 in the order in which the tasks are to be carried out. Each of the columns of the blocks 22 indicate a period of time. The particular period of time can be indicated directly above the uppermost block 22 in each of the columns. As shown, there are seven columns of the blocks 22, one column for each day of the week. Thus, the days of the week can be written in consecutive order above the columns of blocks 22 starting with the column adjacent the first column of blocks 20. A plurality of hooks 24 are mounted on the sheet 12 with each hook 24 being positioned at the top center of a block 22. Although only a few of the hooks 24 are shown, it is to be understood that each of the blocks 22 has a hook 24 secured thereon. Hooks 24 support the indicating discs 26 over the blocks 22. Each of the hooks 24 is long enough to receive a plurality of the indicating discs 26 thereon.

As shown in Figures 3 and 4, each of the indicating discs 26 comprises a thin, flat, circular disc of wood, cardboard, or plastic. Disc 26 has a hole 28 therethrough adjacent its outer periphery for receiving the hook 24. Discs 26 are provided with indicia on their opposite faces to indicate completion or non-completion of a task. As shown in Figure 3, one face of the discs 26 is provided with an illustration of a smiling face to indicate the completion of a task. As shown in Figure 1, the other face of the discs 26 is provided with an illustration of a frowning face to indicate non-completion of a task. However, the discs 26 may be provided with any desired type of indicia to indicate the completion and non-completion of the tasks. The discs 26 are also provided with indicia to indicate the particular child represented by the disc. For example, the discs 26 may be painted different colors, or may have different colored faces thereon with each color representing a particular child. Also, the discs 26 may be of different shapes, such as star shaped, triangular, circular, etc., with each shape representing a particular child. No matter what shape or shapes of discs 26 are used, the dimensions of the discs 26 should not be greater than the dimensions of the blocks 22, so that each disc 26 will cover only one block 22.

The top margin 16 is provided with a group of blocks 30 in which the names of the children using the job performance board 10 are indicated. Blocks 30 also contain indicia for indicating which of the various indicating discs 26 refers to each particular child. Thus, if various colored discs 26 are being used, a dot 32 of the color representing the child can be placed in the block 30 next to the child's name. If different shaped discs 26 are being used, a representation of the shapes can be drawn in the blocks 30. A pair of hooks 34 are secured to the sheet 12 adjacent opposite sides of the top margin 16. An additional pair of hooks 36 are secured to the sheet 12 in the bottom margin 18. Hooks 34 and 36 support a supply of the indicating discs 26 for use with the job performance board 10.

The job performance board 10 of the present invention is used in the following manner:

During each day, the indicating discs 26 are placed on the various hooks 24 in the column for the particular day with the smiling face showing if he completed the particular task, or with the frowning face showing if he did not complete the task. At the end of each day, the job performance board 10 is reviewed with the child to remind him of the tasks which he did not complete. Thus, the job performance board 10 provides the child with an incentive to complete all of his daily tasks so that all of the indicating discs 26 will have the smiling face showing. If there are a number of children in a family, each child is assigned a different color or different shaped disc. At the end of a day, each hook 24 will contain a number of the indicating discs 26 corresponding to the number of children in the family. Thus, the children can compete against each other to see which child remembers to complete the tasks. At the end of the week, the child having all of his indicating discs 26 with the smiling face showing, or the child having the most indicating discs 26 with the smiling face showing can be rewarded. At the end of each week, the indicating discs 26 are removed from the hooks 24, and placed on the hooks 34 and 36 so that the job performance board 10 can be used for the following week.

In addition for use with children, the job performance board 10 can be used in industrial plants, sales offices, and other commercial establishments. For example, the job performance board 10 can be used for indicating the desired and actual progress of various research and engineering projects. The various projects would be indicated in the blocks 20 of the first column of blocks, and the columns of the smaller blocks 22 would represent various time intervals. The indicating discs 26 would be placed on the hooks 24, and would have indicia on their other surface indicating the stage of the project which should be completed during the particular time interval. At the end of each time interval, if the stage of the project indicated on the indicating disc was completed, the indicating disc 26 could either be removed or turned over. However if the particular stage of the project was not completed, the indicating disc can be turned over, and the other side of the indicating disc 26 marked with the actual stage of the project completed during that time interval. Thus, the job performance board 10 would provide a complete picture of the progress of each of the projects. Also, the job performance board 10 of the present invention could be used as a sales or production record for various products. The various products would be listed in the blocks 20, and the indicating discs 26 marked with either the amount of sales or production of the products during a particular time interval. Similarly, the job performance board 10 could be used as part of an incentive program to show the output of various operators or the amount of sales brought in by various salesmen.

Fig. 5 shows a modification of the job performance board of the present invention, generally designated as 40.

Job performance board 40 comprises a sheet 42 of a rigid material, such as wood, fiberboard, heavy cardboard, or plastic. A thin sheet 44 of a magnetic metal is secured across the front surface of the sheet 42, and a thin layer 46 of a non-magnetic material, such as paper, is secured across the metal sheet 44. The outer layer 46 has a chart thereon which is similar to the chart 14 of the job performance board 10 shown in Figure 1. The indicating discs 48 comprise a thin, flat disc of a non-magnetic material, such as plastic, wood, or cardboard. A permanent magnet 50 extends through the indicating disc 48 adjacent the periphery of the disc 48, and is secured to the disc 48. The indicating disc 48 is provided with indicia on its opposite faces in the same manner as the indicating disc 26. The job performance board 40 is used in the same manner as previously described with regard to the job performance board 10. The indicating discs 48 are mounted on the job performance board 40 by placing one side of the magnet 50 against the surface of the outer layer 46. The magnet 50 will attract the metal layer 44 beneath the outer layer 46, and thereby hold the indicating disc 48 on the job performance board 40.

The present invention may be embodied in other specific forms without departing from the spirit or essential attributes thereof and, accordingly, reference should be made to the appended claims, rather than to the foregoing specification as indicating the scope of the invention.

I claim:

1. A job performance board comprising a sheet of rigid material having a sheet of magnetic material secured thereto, a chart on one surface of a sheet of non-magnetic material secured to said sheet of magnetic material, said chart containing a plurality of blocks arranged in aligned rows and columns, the first column of said blocks serving to indicate various jobs or tasks and the other columns of said blocks serving to indicate intervals of time, a plurality of indicating discs, each of said indicating discs having indicia on both sides thereof, and a permanent magnet extending outwardly from both sides of the indicating discs for mounting said discs on each of the blocks of the time interval indicating columns.

2. A job performance board for teaching children to carry out daily tasks comprising a sheet of rigid material, a chart on one surface of said sheet, said chart containing a plurality of blocks arranged in aligned rows and columns, the first column of said blocks serving to indicate the various tasks to be carried out and the other columns of the blocks serving to indicate the days of the week, a plurality of flat indicating discs, each of said indicating discs having indicia on one side thereof to indicate completion of a task and different indicia on the other side thereof to indicate non-completion of a task, said discs having different distinguishing features to indicate various children using the job performance board, the blocks in the first column being wider than the blocks in the other columns, the blocks in the other columns being of the same width, said chart having a substantially blank space extending across the top and bottom thereof for storing a plurality of discs, and means for mounting said discs on each of the blocks of the days indicating columns.

3. A job performance board in accordance with claim 2 in which the means for mounting the indicating discs on the blocks comprises a plurality of hooks secured to the sheet with one hook being positioned in each of the blocks of the days indicating columns, and each of said discs has a hole therethrough for receiving a hook each of the hooks being positioned at the top center of its respective block, and the holes in each of the indicating discs being adjacent the periphery of the disc.

4. A job performance board in accordance with claim 2 in which the means for mounting the indicating discs on the blocks comprises a sheet of magnetic metal secured to the base sheet of the board, and an outer layer of non-magnetic material secured over said sheet of magnetic metal with the chart being on said outer layer, and each of said indicating discs has a permanent magnet extending therethrough.

References Cited in the file of this patent

UNITED STATES PATENTS

| | | |
|---|---|---|
| 1,268,613 | Radebaugh | June 4, 1918 |
| 1,665,568 | Spiegel | Apr. 10, 1928 |
| 1,694,639 | Brown | Dec. 11, 1928 |
| 1,806,156 | Fox | May 19, 1931 |
| 1,810,334 | Andres | June 16, 1931 |
| 2,512,485 | Cougias | June 20, 1950 |
| 2,668,370 | Trimble | Feb. 9, 1954 |
| 2,883,765 | Blaine | Apr. 28, 1959 |